INVENTORS
JEAN-PAUL L. VAN DIEVOET
JEAN G. DEWANDELEER
ROBERT O. CHARLES

BY Robert R. Priddy
ATTORNEY

March 2, 1971  JEAN-PAUL L. VAN DIEVOET ET AL  3,567,582
NUCLEAR FUEL SUBASSEMBLIES AND COMBINATIONS THEREOF
Filed Feb. 23, 1968  3 Sheets-Sheet 2

INVENTORS
JEAN-PAUL L. VAN DIEVOET
JEAN G. DEWANDELEER
ROBERT O. CHARLES
BY Robert R. Priddy
ATTORNEY

INVENTORS
JEAN-PAUL L. VAN DIEVOET
JEAN G. DEWANDELEER
ROBERT O. CHARLES

BY Robert R. Priddy
ATTORNEY

United States Patent Office 3,567,582
Patented Mar. 2, 1971

3,567,582
NUCLEAR FUEL SUBASSEMBLIES AND
COMBINATIONS THEREOF
Jean-Paul L. Van Dievoet, Brussels, Jean George DeWandeleer, Overijsche, and Robert Odon Charles, Chatelet, Belgium, assignors to Societe Belge pour l'Industrie Nucleaire, S.A., "Belgonucleaire," Brussels, Belgium
Filed Feb. 23, 1968, Ser. No. 707,728
Claims priority, application Belgium, Feb. 23, 1967, 40,148
Int. Cl. E21c; E21b
U.S. Cl. 176—78                                7 Claims

ABSTRACT OF THE DISCLOSURE

In a fuel subassembly for use in nuclear reactors, a support member which includes three or more elongated webs, each having one of its longitudinal edges joined with a common nexus from which the several webs radiate in an angularly spaced array, and fuel rods attached to the central support member within the thus-defined angular spaces in open lateral communication with the exterior of the subassembly. Groups of such subassemblies in which webs in different but adjoining central support members are disposed closely adjacent to one another along their outer longitudinal edges, and webs on a plurality of different central supports define cells containing fuel rods, thereby minimizing the amount of neutron-absorbing structural material required in each subassembly.

BACKGROUND OF THE INVENTION

(1) General field

The present invention relates to fuel subassemblies and groups of such subassemblies for use in nuclear reactors.

(2) Prior art

Heretofore, to provide support for generally parallel bundles of fuel rods in the core of a reactor and to make them readily removeable in groups during periods of shutdown, the bundles of rods have been fashioned into subassemblies. In one known type of subassembly, the rods are simply mounted within an elongated casing, e.g. a tube, having imperforate side walls. These walls have to be fairly thick or extensively braced to resist deformation by the pressure differential which necessarily prevails between the inside and the outside of the casing when it was in use in the reactor. It was eventually recognized that the amount of bracing required and/or the thickness of the casing walls could be reduced if the differential pressure were dissipated by extensively perforating the casing walls. However, this alternative has not proven altogether satisfactory.

(3) The problem to which the present invention is addressed

While perforation of the casing walls reduced the amount of structural material required in the fuel assemblies, it increased the hazards of operating the reactor, since the effects of an upset in conditions in one subassembly could readily spread throughout the core via the perforations. On the other hand, if an imperforate casing were used the extra structural material contained in the thick casing walls and/or bracing absorbed, and therefore wasted, some of the neutrons released by the nuclear fuel, thus impairing the efficiency or neutron economy of the reactor. Thus, we wish to point out that selection of one of the above-described types of prior art subassemblies requires a sacrifice of neutron economy or safety of operation or both. Thus, in our view, there is a need for improvements in nuclear fuel subassemblies which will avoid or at least lessen the necessity for such a sacrifice. It is a principal object of this invention to fulfill this need, although other objects will become apparent from the descriptions of the invention and certain preferred embodiments thereof which follow.

BRIEF SUMMARY OF THE INVENTION

We have found that the foregoing object can be fulfilled by a nuclear fuel subassembly in which the exterior of the subassembly is at least for the most part defined by the bundles of fuel rods themselves and not by a perforate or imperforate casing, and the group of bundles in a given subassembly is supported from within the group by a fixed array of three or more angularly spaced, elongated webs, each of which adjoins the others along an inner edge. Groups of such subassemblies may be formed in which the outer edges of webs in one subassembly are fixed in closely adjacent relationship to the outer edges of webs in one or more other subassemblies to define between these subassemblies a laterally confined cell containing fuel rods attached to the different subassemblies. The broad inventive concepts just stated may be better understood when considered in connection with the discussion and accompanying drawings.

DISCUSSION

Figure 1:
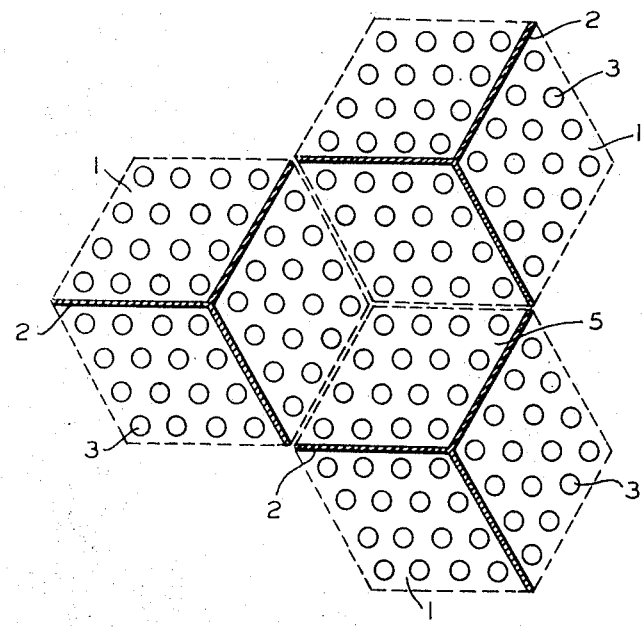
FIGS. 1, 2A and 2B are schematic, horizontal sections of sets of subassemblies in accordance with the invention.

Referring to FIG. 1, it shows an arrangement of three subassemblies 1. Each subassembly includes three webs 2 around which the fuel rods 3 are disposed in a triangular lattice. The rods 3 are connected to the webs and held in position by any known means (not shown in FIG. 1). It is apparent from FIG. 1 that the arrangement of the subassemblies 1 in a group in which the outer edges of the webs 2 in the different sub-assemblies are contiguous creates hexagonal cells 5.

Figure 2A:
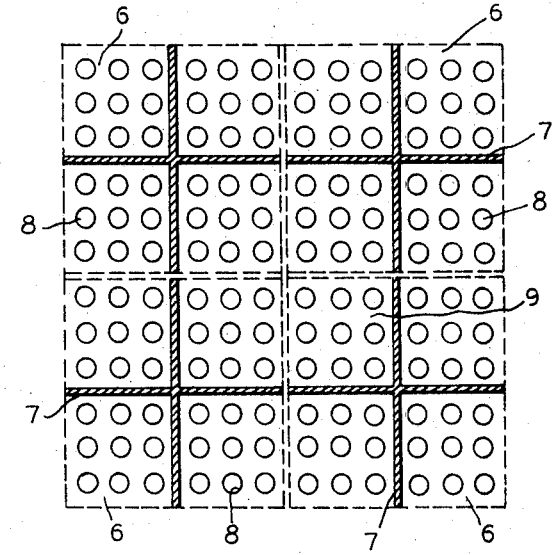
Figure 2B:
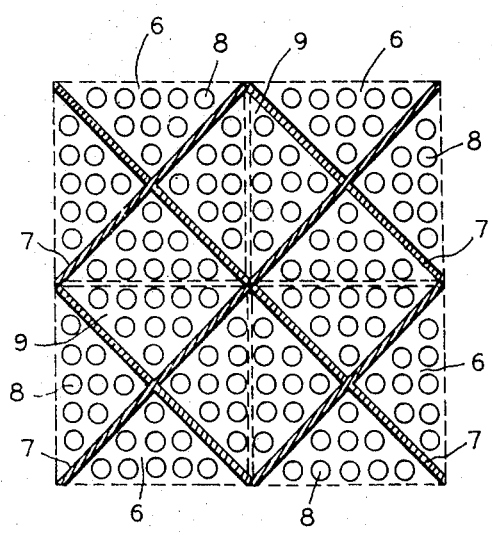

Two other modes of practicing the present invention are illustrated by FIGS. 2a and 2b, which show arrangements of four subassemblies 6 of fuel rods. Each subassembly 6 includes four webs 7, around which the fuel rods 8 are disposed in a square lattice. The figures clearly show that the juxtaposition of the subassemblies 6 forms a cell 9 with square geometry.

DESCRIPTION OF A PREFERRED EMBODIMENT

Figure 9:
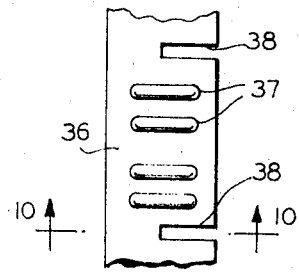
FIG. 9 is a side elevation of a portion of the grid of FIG. 8.
Figure 10:
FIG. 10 is a sectional view along section line 10—10 of FIG. 9.
Figure 11:
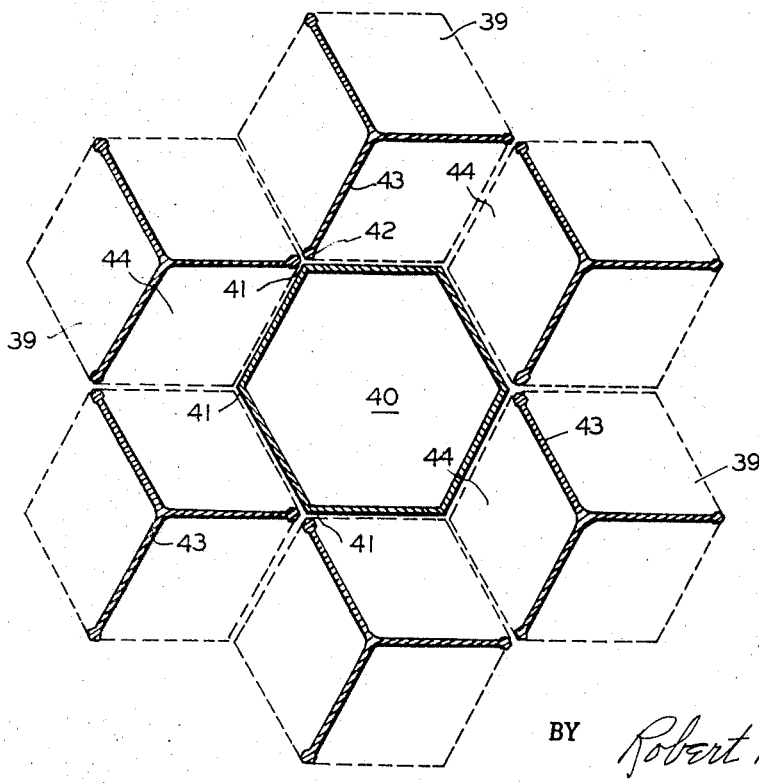
FIG. 11 is a schematic sectional view of a conventional subassembly with an imperforate casing which is surrounded by sub-assemblies in accordance with the invention.

Without any intention of limiting the invention to the exact form shown, we have disclosed preferred embodiments in FIGS. 3-10 and 11. FIGS. 3-10 show the preferred embodiments of the fuel assembly while FIG. 11 schematically depicts an arrangement of several of these subassemblies around a conventional fuel subassembly of the type having a closed casing.

Figure 3:
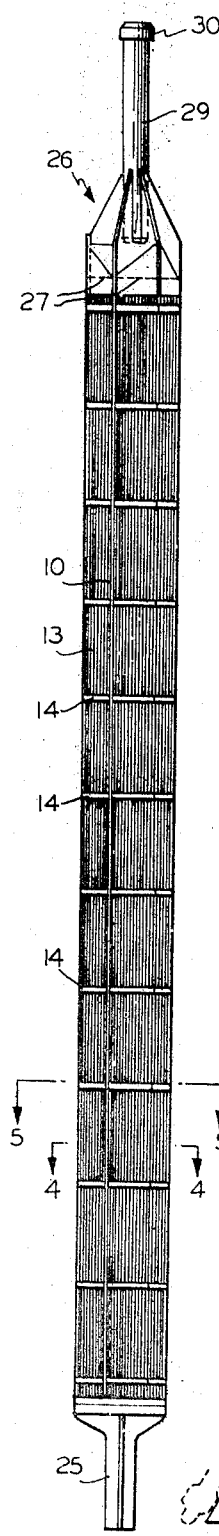
FIG. 3 is a side elevation of a preferred embodiment of a nuclear fuel subassembly in accordance with the invention.
Figure 4:
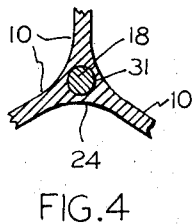
FIGS. 4 and 5 are enlarged, partial sectional views taken along section lines 4—4 and 5—5 in FIG. 3.

The fuel subassembly is shown in side elevation in FIG. 3. As may be seen in the partial sectional view provided by FIG. 4, the longitudinal "back-bone" of the assembly is provided by the three webs 10 which adjoin and preferably are fixedly secured to one another along one longitudinal edge of each. In fact, as shown in the present embodiment, it is most preferred that the three webs be integral with one another so that they meet in a common nexus 24. Thus, the webs may be fashioned integrally by extrusion or by welding individual sections together. The webs extend upwardly from and are attached to a foot 25 shown in FIG. 3. Foot 25 is of cruciform cross-section for insection in a conventional socket of corresponding cross-section which is provided in a known manner in a plate or other holder at the bottom of the core in the reactor vessel (not shown). At their upper ends, the radially outer extremities of the webs are attached such as by welding to the inside of a rigid hexagonal head box 26 open at the top and bottom. The lateral surfaces of the head box 26 are formed of plates 27 supported on six triangular stiffeners 28 which are fixedly secured in radially disposed upright position around pickup shaft 29 having a pick-up head 30. Thus, the foot 25, webs 10, head box 26, stiffeners 28 and shaft 29 constitute, when assembled, a unitary supporting means which may be lifted by pick-up head 30, transported from place to place and lowered into position in a reactor core.

Figure 5:
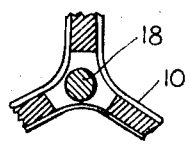

The aforementioned unitary supporting means serves as a carrier for fuel rods 13 (see FIG. 3) which extend vertically from the head box 26 to foot 25. The rods are supported at intervals by grids 14. For the most part, the intersection or nexus 24 of the webs 10 has the cross section shown in FIG. 4. However, at spaced locations along the nexus of the webs corresponding in vertical elevation to the positions of grids 14, the nexus is cut away as shown in FIG. 5. Throughout the length of the nexus, both in the cut-away portions and those which are not, extends a rod 18 which passes through a bore 31 in the nexus. Rod 18 assists in holding the grids in place as may better be seen in FIG. 6.

Figure 6:
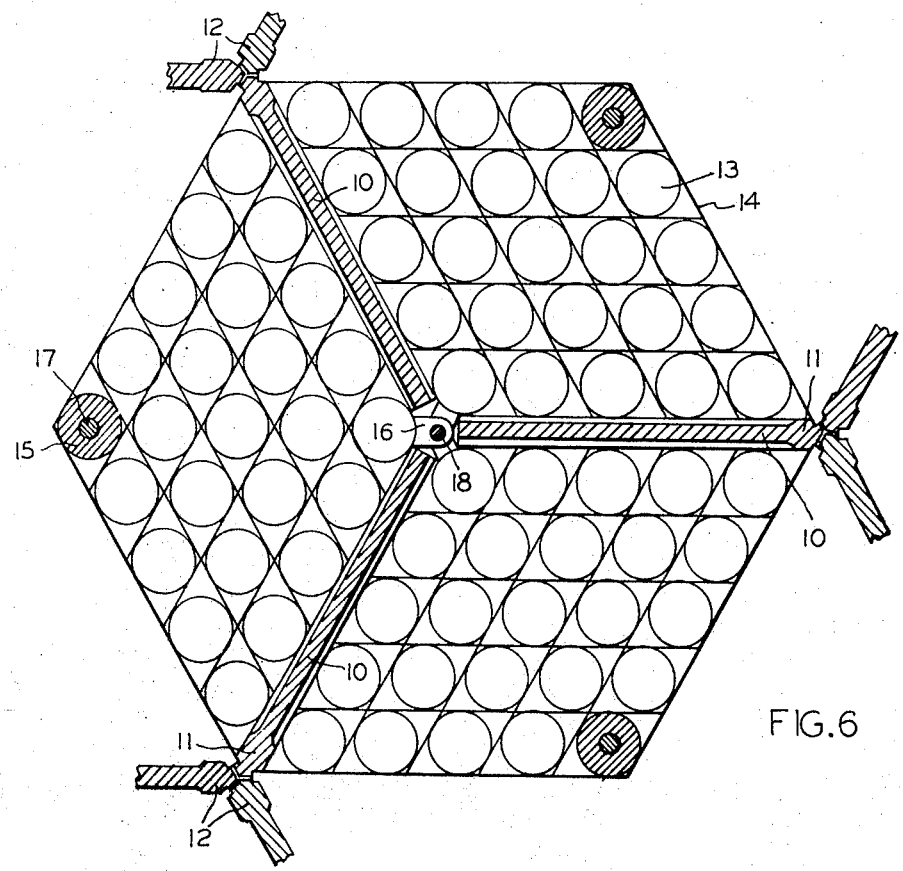
FIG. 6 is a complete sectional view taken along section line 5—5 in FIG. 3, which view also contains fragments of the webs belonging to other subassemblies in a group of subassemblies of the type suggested by FIG. 1.

FIG. 6 is a sectional view perpendicular to the axis of rod 18 at the same vertical position as FIG. 5. In FIG. 6 are seen the three webs 10, their outer extremities 11, the outer extremities 12 of portions of webs on other fuel sub-assemblies, fuel rods 13, the grids 14, collars 15 fixedly secured in the grids 14, tabs 16 fixedly secured to grids 14 with holes (FIG. 8) 32 therein through which the rod 18 passes, and rods 17 which pass through the collars 15 (FIG. 6). The inside corners of the grids are held up by the tabs 16 which are fixed in the cut-away portions of nexus 24 by rod 18. The outside corners of the grids 14 are held up by the collars 15 which are in turn supported on the rods 17 in a manner shown more clearly in FIG. 7.

Figure 7:
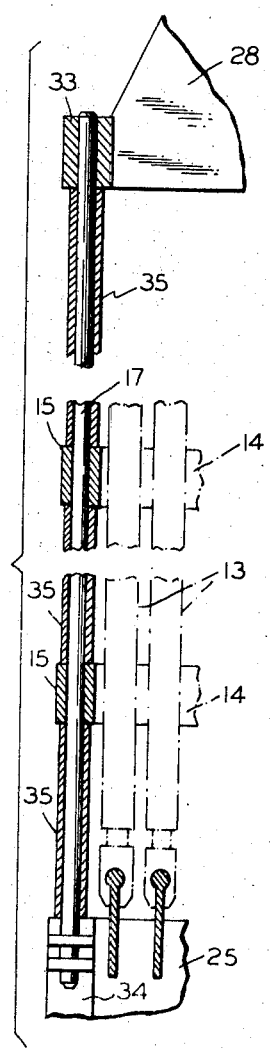
FIG. 7 is a partial sectional view taken on section line 7 of FIG. 6.

In FIG. 7 is seen a portion of one of the six stiffeners 28 in the head box 26. Each of three of these stiffeners has an upper socket 33 formed at its outer extremity which upper socket is secured between the stiffener and the inside of the head box. The three stiffeners 28 having sockets 33 alternate with the three remaining stiffeners which have no sockets and which therefore are connected directly to the insides of the plates 27 forming the head box. The radial and angular positions of upper sockets 33 correspond with those of the collars 15 in the grids and of corresponding lower sockets 34 in the foot assembly 25, so that each rod 17 may pass through the corresponding upper sockets 33, collars 15 and lower sockets 34. To help maintain the desired vertical spacing between the grids 14, spacer tubes 35 are interspersed with the collars 15 on the rod 17.

Figure 8:
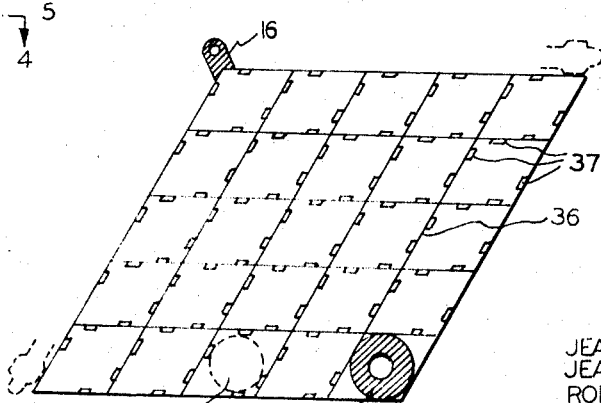
FIG. 8 is a detailed top view of the grid of FIG. 6.

Additional details on the grids are shown in FIGS. 8 through 10. The grids are formed of dimpled plates 36 having raised projections or dimples 37. These plates are brazed or riveted together back to back in pairs so that the resultant pairs have projections facing outward on either side as shown in FIG. 10. The pairs of plates are provided with slots 38 to engage with similar slots on other pairs of plates in the building up of the grid in accordance with the usual practice of forming grids.

Those corners of the resultant grid which are not supported by tabs 16 or collars 15 may be supported by fastening them to the outer extremities 11 of the webs 10 either by welding or riveting. The number and spacing of the dimples 37 are such as to provide in each grid opening four elastic contacts with the fuel rods 13.

It is apparent that the invention is susceptible to use in varying forms. For instance, one may readily fabricate assemblies in which more than four webs will be employed. However, the use of additional webs without proportionally diminishing the thickness of existing webs will add to the amount of neutronic absorption that occurs, and may complicate the grid structure, so that a subassembly with three or four webs, spaced angularly at intervals of 120° or 90° respectively is preferred. The several webs are preferably formed in an integral assembly, e.g. formed in a single piece, as by extrusion, but this is by no means essential. The webs may be formed of individual pieces of metal which are fixedly secured to one another by any means which can bind them into a relatively rigid assembly. For instance, the adjoining edges of the webs may be fastened together by welding or by brackets and either continuously or at spaced points on their adjoining edges or at each end or by a combination of such fastening arrangements. The outer edges of the webs preferably extend outward from the longitudinal axis of the subassemblies by a greater distance than any of the fuel rods, so that the webs in different subassemblies may come into direct contact with one another while maintaining some clearance between the fuel rods in the different fuel assemblies. This is not essential however if means such as joiner plates are provided for interconnecting shorter webs in different subassemblies with one another. Such joiner plates may be secured to the webs or to other parts of the reactor vessel or core. The best arrangement however is considered to be that in which the radial outward extensions of the outer extremities of the webs are greater than those of any of the fuel rods so that the webs in different subassemblies may contact one another directly when placed in groups. In such case the outer edges of the webs should be formed in a complementary manner so as to be snug-fitting with one another for substantially maintaining within a cell any overpressure formed therein. The complementary shaping may result in the outer edges of the webs being flattened, as indicated in FIG. 2a or bevelled, e.g. with convergent surfaces whose angles of convergence are equal to the angles of divergence of the webs as shown in FIG. 6. These and other treatments of the outer edges are possible.

It is also apparent that grid assemblies per se are known and that any known type of grid or other equivalent holding means may be used to secure the fuel rods in place on the fuel subassemblies of the invention. In like fashion, various arrangements for securing fuel subassemblies in upright position in the core of a reactor are known, and any such known arrangement may be employed with the invention. In view of the fact that those persons who possess ordinary skill in the art are generally aware of how to build a reactor vessel and core and how to secure and use in a reactor a fuel subassembly of the general class to which the present invention pertains, it has not been necessary to disclose the details of a complete reactor or core herein.

In FIG. 11 is a group of six subassemblies 39 in accordance with the invention surrounding a subassembly 40 of the classical type. The edges 41 of the subassembly 40 and the ends 42 of the webs 43 of the subassemblies 39 are preferably complementary, e.g. snug-fitting, in order to contain any overpressure generated in the cells 44. One may also combine rows of subassemblies in accordance with the invention with rows of subassemblies of the classical type. This may be done for instance in fast breeder reactors in which subassemblies in accordance with the invention would contain the fissile material, and subassemblies of the classical type would hold the fertile material surrounding the fissile material.

Among the main advantages provided by a subassembly or group of subassemblies according to the invention, are an important decrease of the amount of structural materials to be used, while nevertheless providing a strong and rigid structure and the ability to contain overpressure within a cell, as may occur in the case of an accident. The invention also permits quick dissipation of residual heat from the assembly during its removal from the reactor and its dismantling, and easy dismantling of the assembly itself after its removal from the reactor vessel.

In conclusion, while the foregoing specification and drawings describe the construction, operation and use of certain preferred embodiments of the instant invention, it is to be understood that we do not intend to limit ourselves to the precise constructions and arrangements herein disclosed, since the various details of construction, form and arrangement may obviously be varied to a considerable extent by any person skilled in the art without really departing from the basic principles and novel teachings of this invention and without sacrificing the major advantages thereof. Accordingly, the appended claims are intended to encompass all changes, variations, modifications and equivalents falling within the scope of our invention.

What we desire to protect by United States Letters Patent is:

1. A support member for a plurality of nuclear fuel rods in which said support member and said rods form an integral fuel subassembly and said fuel subassembly is adapted to form one of a plurality of fuel subassemblies making up a nuclear reactor fuel assembly, comprising; a plurality of elongated webs radiating outwardly from a common, vertically-disposed nexus, forming angular spaces therebetween and having outer vertical edges to provide contact with the edges of other adjacent fuel subassemblies, and means for detachably supporting said fuel rods on said webs with at least some of said rods disposed within said angular spaces between said webs.

2. A support member in accordance with claim 1 wherein the fuel rods are in open lateral communication with the exterior of the fuel subassembly.

3. A support member in accordance with claim 1 wherein the webs are imperforate.

4. A support member in accordance with claim 1 wherein the means for supporting the fuel rods on the webs include a plurality of horizontally-disposed grids fastened to said webs at vertically spaced intervals.

5. A support member in accordance with claim 1 wherein three webs are provided having an angular spacing therebetween of 120°.

6. A support member in accordance with claim 1 wherein four webs are provided having an angular spacing of 90° therebetween.

7. A nuclear reactor fuel assembly, comprising; a plurality of fuel subassemblies, each of said fuel subassemblies including a support member for a plurality of nuclear fuel rods including a plurality of elongated webs radiating outwardly from a common, vertically-disposed nexus and forming angular spaces therebetween, a plurality of nuclear fuel rods at least some of which are disposed within said angular spaces between said webs and means for detachably supporting said fuel rods on said webs, and a plurality of said subassemblies are fixedly disposed with the outer vertical edges of said webs in contact with one another to thereby form closed cells containing said fuel rods.

References Cited
UNITED STATES PATENTS

| | | | |
|---|---|---|---|
| 3,212,983 | 10/1965 | Kornbichler | 176—78X |
| 3,267,000 | 8/1966 | Ashcroft et al. | 176—78X |
| 3,317,398 | 5/1967 | Hutter | 176—78 |
| 3,367,840 | 2/1968 | MacPhee | 176—78 |
| 3,389,056 | 6/1968 | Frisch | 176—78 |
| 3,255,091 | 6/1966 | Frisch | 176—78 |

BENJAMIN R. PADGETT, Primary Examiner

G. G. SOLYST, Assistant Examiner